US010013293B2

(12) United States Patent
Schofield et al.

(10) Patent No.: US 10,013,293 B2
(45) Date of Patent: *Jul. 3, 2018

(54) QUEUEING MESSAGES RELATED BY AFFINITY SET

(75) Inventors: Andrew J. Schofield, Eastleigh (GB); Philip G. Willoughby, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 1257 days.

This patent is subject to a terminal disclaimer.

(21) Appl. No.: 13/453,513

(22) Filed: Apr. 23, 2012

(65) Prior Publication Data

US 2012/0290639 A1 Nov. 15, 2012

Related U.S. Application Data

(63) Continuation of application No. 12/816,486, filed on Jun. 16, 2010, now abandoned.

(30) Foreign Application Priority Data

Jun. 17, 2009 (GB) .................................. 09162992.3

(51) Int. Cl.
*G06F 9/54* (2006.01)
(52) U.S. Cl.
CPC ........ *G06F 9/546* (2013.01); *G06F 2209/548* (2013.01)
(58) Field of Classification Search
CPC ............................ G06F 9/546; G06F 2209/548
See application file for complete search history.

(56) References Cited

U.S. PATENT DOCUMENTS 6,226,641 B1 * 5/2001 Hickson et al.
2008/0019351 A1 * 1/2008 Piper et al. ................... 370/352

OTHER PUBLICATIONS

"Queue Manager Clusters" IBM Nov. 2000, 163 pages.*
IBM, "MQSeries Application Programming Reference," 1999, 18 pages.*

* cited by examiner

*Primary Examiner* — H. Sough
*Assistant Examiner* — Carina Yun
(74) *Attorney, Agent, or Firm* — Parashos T. Kalaitzis; Robert C. Rolnik

(57) ABSTRACT

In a messaging and queuing system that supports a cluster of logically associated messaging servers for controlling queues of messages, messages are processed. In response to an application program command to a first messaging server, a queue is opened, the queue having multiple instances on further messaging servers of the cluster. Responding to first messaging server putting messages on the queue, messages are distributed among the multiple instances of the queue on their respective messaging servers so as to balance. For the first message of an affinity set, access information for the particular queue instance to which it is put is obtained and stored. The access information may be used in order to send the further message to the particular queue instance and, if said further message is not part of the affinity set, it is put to an instance of the queue as determined by said predetermined rules.

3 Claims, 6 Drawing Sheets

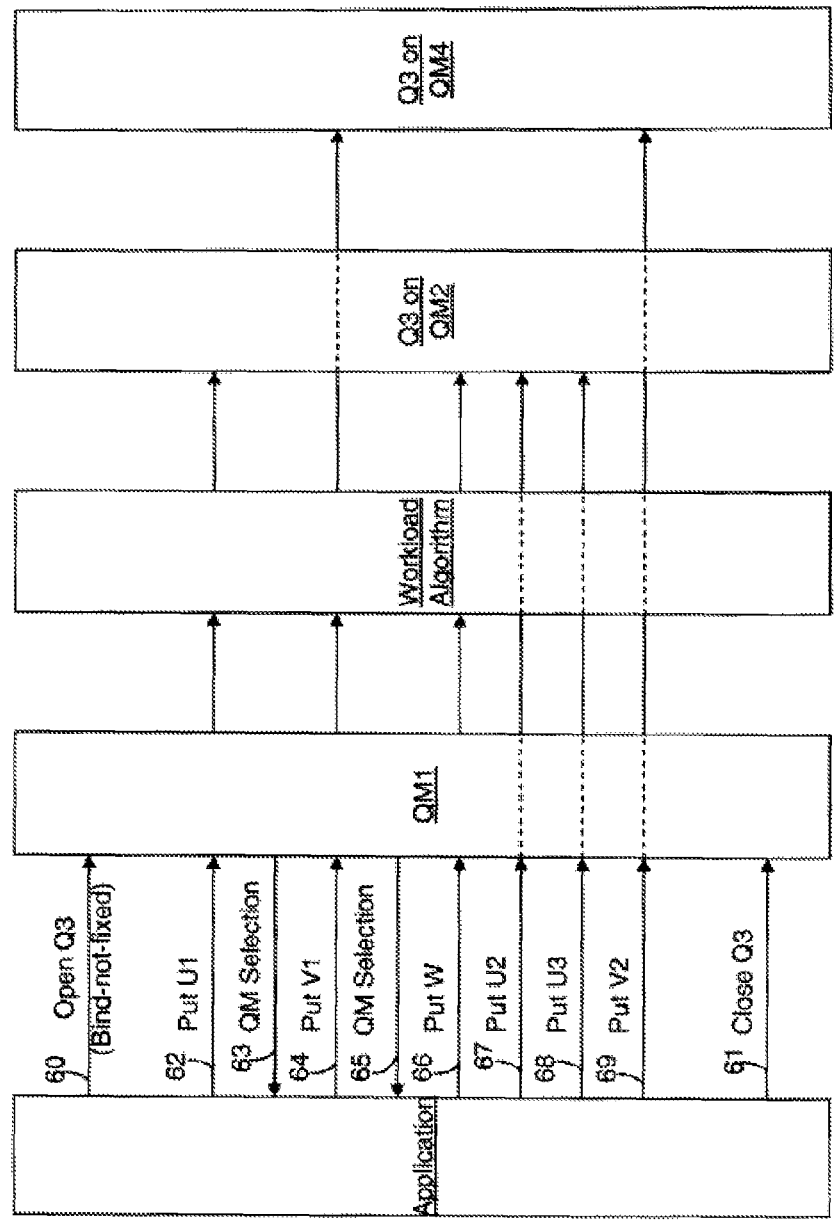

QUEUEING MESSAGES RELATED BY AFFINITY SET

CROSS-REFERENCE TO RELATED APPLICATIONS

The present application is a continuation of U.S. application Ser. No. 12/816,486, filed Jun. 16, 2010, entitled "QUEUING MESSAGES RELATED BY AFFINITY SET" which is assigned to the assignee of the present invention and incorporated herein by reference in its entirety.

FOREIGN APPLICATION PRIORITY DATA

This application claims benefit of priority of Foreign Patent Application No. 09162992.3, filed in the European Patent Office on Jun. 17, 2009, which is herein incorporated by reference.

BACKGROUND

The present invention relates to a method for processing affinity sets of related messages in a messaging and queuing system.

In recent years, the ability of application programs to communicate with each other or with system provided services in a computer system or network without having to become involved in the complexities of particular operating systems or communication protocols has been much enhanced by the development of Message Oriented Middleware (MOM). This is software running on top of a computer operating system which provides a common programming interface by means of which applications can communicate with other applications without specific knowledge of the different operating systems and/or protocols which may be used by those applications.

One example of Message Oriented Middleware (MOM) is the IBM WebSphere MQ product family. The most recent version, WebSphere MQ for z/OS Version 7.0 ("IBM", "WebSphere" and "z/OS" are trademarks of International Business Machines Corporation), is described in an Information Center on the IBM Corporation website.

WebSphere MQ and other MOM products employ message queuing which allows programs to send and receive application specific data to each other without having a private, dedicated logical connection established between them. Instead, the applications communicate using messages containing a message descriptor and the application specific data. The messages are held on queues by a queue manager. The queue manager is effectively the runtime component of the MOM product and may also be referred to as a messaging server.

These queues may be accessed directly by applications on the same system using the same queue manager or their contents may be transmitted over a network or multi node system and placed on respective associated queues accessible to a receiving application via its respective local queue manager. In order to transmit messages to remote applications, the originating queue manager must first establish a communication channel to the remote queue manager. Both transmission and accessing of queued messages take place asynchronously.

Applications communicate with their associated queue managers via a standard application programming interface (API), known as the Message Queuing Interface (MQI) in the case of WebSphere MQ. Specific MQI commands cause the queue manager to store (MQPUT) messages on named destination queues, either directly, if local, or by transmitting them to the appropriate queue manager at a node elsewhere in the system and also to retrieve (MQGET) stored messages from such queues. A queue can be both a source of messages and a destination for messages.

Before an application program can put or get messages from a queue, it must first connect to the queue manager hosting the queue by means of an MQCONN call. The queue manager responds by returning a connection handle, sometimes referred to as Hconn, which is a unique identifier by which the program knows the queue manager. The program can then open the queue by supplying the connection handle as a parameter of an MQOPEN call, which establishes access to an object such as a queue. The output from the MQOPEN call includes an object handle, Hobj, which is an identifier by which the program knows the queue (or any other object) and is used as an input parameter for any subsequent MQI calls to the same queue. When an application has finished putting or getting messages from a queue, it normally closes the queue by means of an MQCLOSE call, specifying the appropriate object handle.

All MQI calls also require the selection of a number of other options or parameters, depending on the precise purpose and context of the operation to be carried out.

In large or heavily used messaging and queuing systems, problems of system administration, availability and workload balancing have been tackled by the use of clusters. Clusters are networks of queue managers that are logically associated. Communication between queue managers in a cluster is much simpler than between unrelated queue managers. Repository queue managers, to which all queue managers have access, have full knowledge of all queue managers in the cluster. Cluster queues are just queues hosted by a cluster queue manager and may be advertised to other queue managers within the cluster to simplify communication.

One aspect of clusters which is important in terms of workload balancing and availability is that more than one queue manager in the cluster can host an instance of the same queue. Because of this, the workload can be distributed between these queue managers, thereby increasing availability. Any one of the queue managers that hosts an instance of a particular queue can handle messages destined for that queue. This means that applications need not explicitly name the queue manager when sending messages. A workload management algorithm determines which queue manager should handle the message.

However, if, in order to benefit from workload management, a messaging and queuing network is set up to have multiple definitions (instances) of the same queue, it is always necessary to consider whether the applications using the system may have message affinities, that is, they exchange related messages which need to be processed on the same instance of a queue.

Because, with this type of cluster, a message can be routed to any queue manager that hosts a copy of the correct queue, the logic of applications with message affinities can be affected. Suppose for example, two applications rely on a series of messages flowing between them in the form of questions and answers. It might be important that all the questions are sent to the same queue manager and that all the answers are sent back to the other queue manager. In this situation, it is important that the workload management routine does not send the messages to any queue manager that just happens to host a copy of the correct queue. Similarly, some applications might require messages to be processed in sequence, for example a file transfer application or database replication application that sends batches of messages that must be retrieved in sequence.

In general, therefore, it is desirable to remove message affinities from applications as far as possible before starting to use clusters. Removing message affinities improves the performance of applications. For example, if an application that has message affinities sends a batch of messages to a queue manager and the queue manager fails after receiving only part of the batch, the sending queue manager must wait for it to recover before it can send any more messages, thereby degrading performance.

Removing messages affinities also improves the scalability of applications. A batch of messages with affinities can lock resources at the destination queue manager while waiting for subsequent messages. These resources may remain locked for long periods of time, preventing other applications from doing their work.

If message affinities can be removed so that it is not necessary to force all messages to be written to the same destination, an option MQOO_BIND_NOT_FIXED is specified on the MQOPEN call. This defers selection of a destination until MQPUT time, that is, on a message-by-message basis. Selection may then be made as determined by the cluster workload management algorithm.

However, removing message affinities in a clustered system is not always possible. The main problem to which the current invention relates is the limitation that message affinities prevent the cluster workload management routines from making the best choice of queue manager.

In such cases, where it is not appropriate to modify applications to remove message affinities, a number of partial solutions to the problem have been proposed. One solution is to specify the remote-queue name and the queue manager name on each MQOPEN call. In this case, all messages put to the queue using that object handle go to the same queue manager, which might be the local queue manager. This makes the application responsible for choosing queue managers in the cluster, something that the cluster software itself should be managing.

A variation on this solution is to allow the queue manager that receives the first message in a batch to return its name in response. The queue manager at the sending end can then extract this queue manager name and specify it on all subsequent messages. The advantage of this method over the previous one is that some workload balancing is carried out to deliver the first message.

The disadvantage of this method is that the first queue manager must wait for a response to its first message before sending subsequent messages. As with the previous method, if there is more than one route to the queue manager, the sequence of the messages might not be preserved.

The currently preferred solution is to force all messages to be put to the same destination within the cluster, by specifying an option MQOO_BIND_ON_OPEN on the MQOPEN call. By specifying MQOO_BIND_ON_OPEN, all messages that are sent to this queue are forced to be sent to the same queue manager and thus to the same instance of the queue. MQOO_BIND_ON_OPEN binds all messages to the same queue manager and also to the same route. For example, if there is an IP route and a NetBIOS route to the same destination, one of these will be selected when the queue is opened and this selection will be honored for all messages put to the same queue using the object handle obtained.

By specifying MQOO_BIND_ON_OPEN all messages are forced to be routed to the same destination. Therefore applications with message affinities are not disrupted. If the destination is not available, the messages remain on the transmission queue until it becomes available again.

All of the above known solutions have the limitation, however, that each queue hosting a set of affinity messages must be separately opened with MQOPEN, restricted according to the above suggested solutions and then closed with an MQCLOSE call before workload management can be resumed for other message processing tasks of the application which do not have affinities or before different affinity sets can be processed. Opening and closing queues in this way consumes both time and resources.

BRIEF SUMMARY

Accordingly, the present invention provides a method of processing messages, including affinity sets of related messages, in a messaging and queuing system of the type capable of supporting a cluster of logically associated messaging servers for controlling and hosting queues of messages, including multiple instances of the same queue on respective messaging servers, the method comprising: in response to an application program command to a first messaging server, opening a queue having multiple instances on respective messaging servers of the cluster; in response to application program commands to said first messaging server to put messages on said queue, distributing messages among the multiple instances of the queue on their respective messaging servers so as to balance the workload between the servers according to predetermined rules; where the message being put is the first message of an affinity set, obtaining and storing access information for the particular queue instance to which said first message is put; and in response to an application program command to said first messaging server to put a further message to the open queue, if said message is part of the affinity set, using the access information in order to send the further message to the particular queue instance and, if said further message is not part of the affinity set, putting it to an instance of the queue as determined by said predetermined rules.

Thus by using workload distribution information obtained in the course of the first put operation of an affinity set of messages, messages of the set can be routed to the same queue manager and queue instance and subsequent unrelated sets or messages can be routed to other queues for workload management or other reasons without the first selected queue having to be closed. This gives greater flexibility and efficiency to the system in handling a mixture of affinity sets and other messages.

The application is able to pass workload distribution information between messages in an affinity set to ensure that a set of logically related messages are processed by the same server. This makes it simple to design conversational applications with message affinities which can still cope with workload distribution of sets of messages which are not related to each other.

Preferably, workload balancing is specified by means of an option in the application program open command which causes selection of the queue instance to be deferred until a command to put messages on the queue is received.

The access information may be an object handle for the queue instance selected by said workload balancing step which was generated as a result of the opening of said queue instance by said first messaging server. In such a case, each further message of an affinity set is put to the same queue instance as its predecessor by reference back to the access information associated with the predecessor message.

Alternatively, the access information may be derived from a message attribute of said first message of the affinity set, created when a particular queue instance is selected for said first message.

According to a further aspect, the invention also comprises a computer program for carrying out the above method steps.

According to a yet further aspect, the invention also comprises a messaging and queuing network for processing messages, including affinity sets of related messages, comprising a cluster of logically associated messaging servers for controlling and hosting queues of messages including multiple instances of the same queue on respective messaging servers, the network comprising: means responsive to an application program command to a first messaging server to open a queue having multiple instances on respective messaging servers of the cluster; means responsive to application program commands to said first messaging server to put messages on the queue; means for distributing messages among the multiple instances of said queue on their respective messaging servers so as to balance the workload between the servers according to predetermined rules; means for obtaining and storing access information for the particular queue instance to which the first message of an affinity set is put; and means responsive to an application program command to said first messaging server to put a further message to the open queue, effective, if said message is part of the affinity set, to use the access information in order to send the further message to the particular queue instance and, if said further message is not part of the affinity set, to put it to an instance of the queue as determined by said predetermined rules.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 6 is a sequence diagram showing how the string of FIG. 5 is processed according to the second example of the present invention.

DETAILED DESCRIPTION

Figure 1:
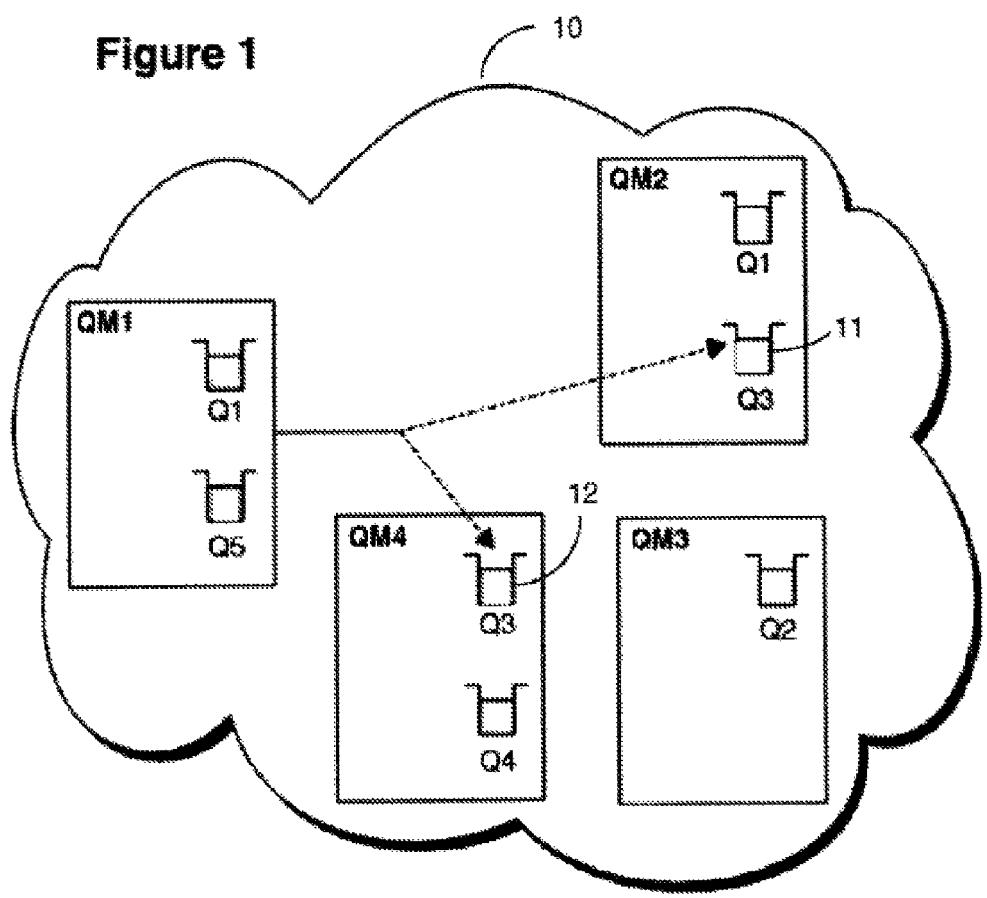
FIG. 1 is a schematic diagram of a queue manager cluster in a messaging and queuing system in which the present invention may be employed.

FIG. 1 illustrates a typical cluster 10 of queue managers, such as IBM's WebSphere MQ Version 7, in a messaging and queuing network. Four queue managers QM1, QM2, QM3 and QM4 are shown hosting a number of queues Q1, Q2, Q3, Q4 and Q5. Although queues Q1, Q2, Q4 and Q5 are unique, two instances, labeled 11 and 12, of Q3 are shown on queue managers QM2 and QM4 respectively. Such a cluster, including the multiple queue instances, is defined by a systems administrator when the cluster is first set up.

If an application on QM2 or QM4 puts a message to Q3, the local instance of Q3, 11 or 12 respectively, is used. However, when an application on QM1 puts a message on QM3, since it does not have a local instance of the queue, it does not necessarily know which instance, 11 or 12, of QM3 will process its message.

If the MQOPEN call, opening Q3, specifies the MQOO_BIND_NOT_FIXED option, the instance, 11 or 12, which is selected is determined by the workload management algorithm for the cluster. Subsequent messages put to the queue may thus go to either instance depending on the loading and algorithm.

If the MQOPEN call specifies the MQOO_BIND_ON_OPEN option, all messages put by QM1 to Q3 will go to the same instance of Q3 until the queue is closed by an MQCLOSE call. Which of the two instances is chosen depends on how the first message to the queue was routed.

Thus, in the workload-balancing cluster of FIG. 1, the preferred situation, where there are multiple instances of a queue such as Q3, is that messages from QM1 having no affinity with each other are distributed between queue managers QM2 and QM4 based on workload. This is achieved by specifying the MQOO_BIND_NOT_FIXED option when an application opens a queue such as Q3.

However, if messages do have an affinity with each other, they must be processed together in the same queue manager QM2 or QM4. Conventionally, this is achieved by the application specifying the MQOO_BIND_ON_OPEN option when it opens Q3 and using the object handle returned as output from the MQOPEN call to ensure that all messages subsequently put to the queue are sent to the same queue instance. However, this entails opening the queue separately for each affinity set of messages and closing it once all of the set of messages has been sent. Where there are multiple affinity sets, this can result in performance degradation.

Figure 2:
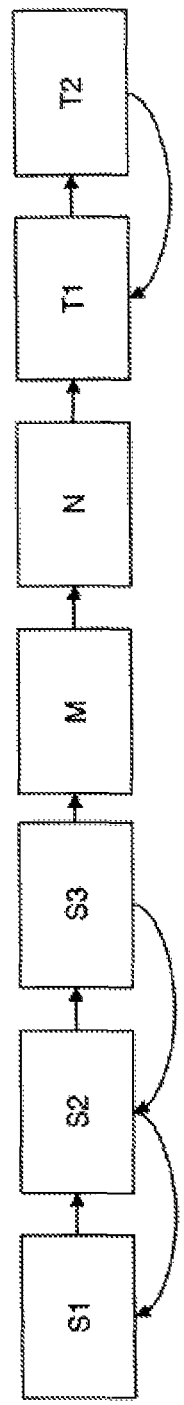
FIG. 2 represents a mixed string of messages including two affinity sets which may be processed in the cluster of FIG. 1 according to one example of the present invention.

Two examples of strings of messages, including affinity sets, will now be considered, in order to illustrate the operation of the present invention. It is assumed that the strings are sent by queue manager QM1 to queue Q3 on either QM2 or QM4. The first example is illustrated in FIG. 2 and comprises a first affinity set of messages S1, S2 and S3, two unconnected messages M and N and a further affinity set of messages T1 and T2. It is necessary that the set S1-S3 should be sent to the same instance of Q3 and that the set T1, T2 should also be sent to the same instance of Q3 (though not necessarily the same one as set S1-S3). It is unimportant to which instance of Q3 the separate individual messages M and N are sent. A possible alternative scenario, which could be represented by FIG. 2, would be that either of the sets represents a conversation between an application program on QM1 and a target program on either QM2 or QM4. Either way, it is necessary that each complete affinity sets end up on the same target queue instance.

Figure 3:
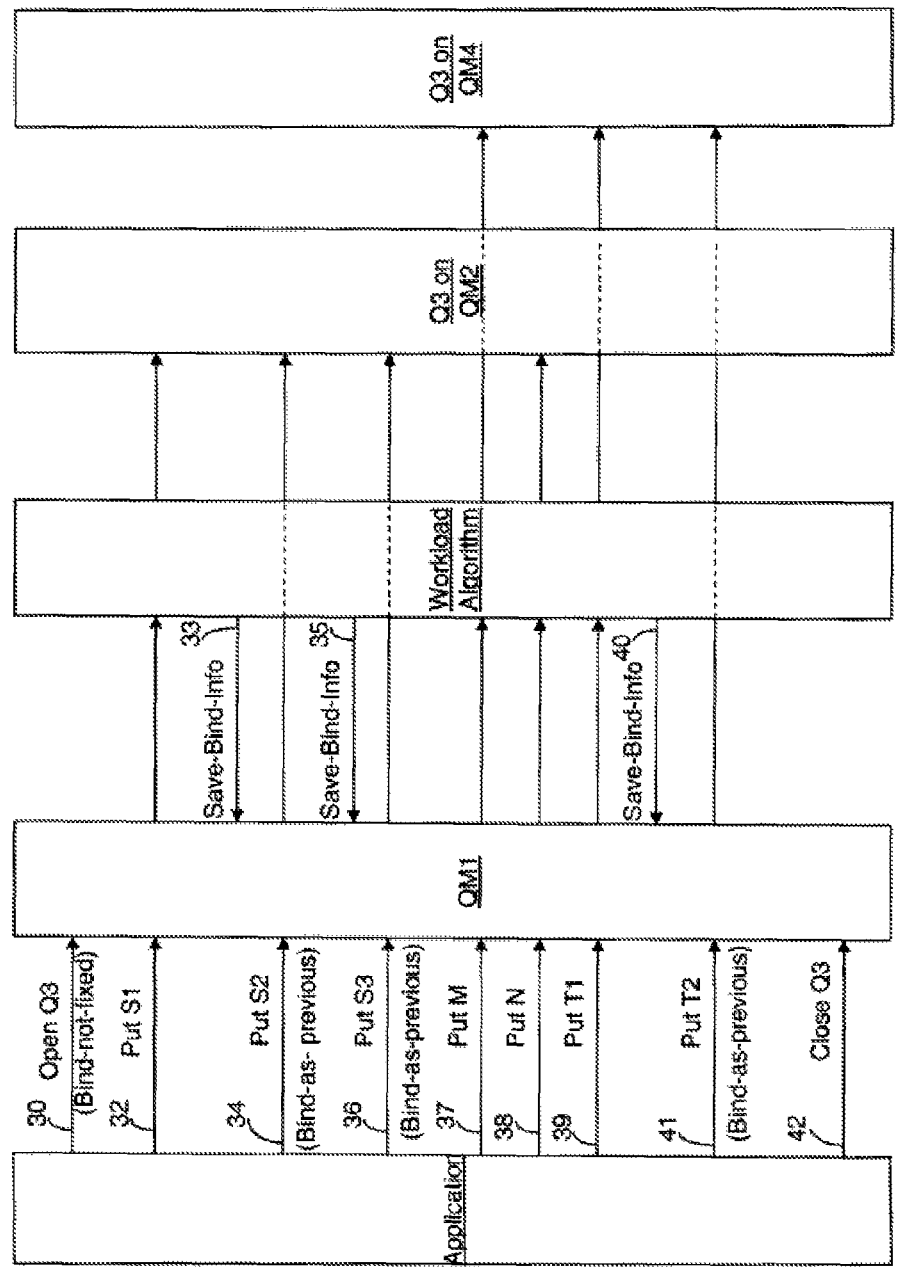
FIG. 3 is a sequence diagram showing how the string of messages of FIG. 2 is processed according to this example of the present invention.

FIG. 3 is a sequence diagram illustrating one way of processing the messages of FIG. 2 without the need to close and reopen the queue Q3. In FIG. 3, queue managers QM1, QM2 and QM4 are represented by vertical bars. QM2 and QM4 host the target queue Q3, as previously indicated. An application program, hosted on QM1, is also represented by a vertical bar to the left of QM1.

The first step shown in line 30 is for the application program to open Q3 by making an MQOPEN call on QM1, specifying the BIND_NOT_FIXED option. No local instance of Q3 exists on QM1 although two instances 11 and 12 of the target queue Q3 exist on respective queue managers QM2 and QM4. Consequently, specifying the BIND_NOT_FIXED option to QM1 means that an MQPUT call on line 32 to QM1 to put the first message S1 of the affinity set S to queue Q3 invokes the workload management algorithm, also represented by a vertical bar. This algorithm distributes the message S1 to QM2, say, and to the instance of Q3 hosted on QM2.

The selection made by the workload algorithm causes QM1 (line 33) to associate the instance on QM2 with the object handle. This could be done automatically but in this example is the result of an additional option on the MQPUT call: "SAVE_BIND_INFO". This causes QM1 to remember the distribution information pointing to the just selected instance of Q3. Since the originating application program knows that the next message S2 is part of an affinity set with S1, when it puts S2 to Q3 (line 34) it includes a special option on the MQPUT call: "BIND_AS_PREVIOUS". This ensures that, by referring to the associated distribution information, message S2 is put to the same Q3 instance as S1, namely the one on QM2. Once again, the queue manager remembers the selected instance of Q3 (line 35) and associates it (line 35) with the relevant object handle.

After this, message S3 is put to Q3 (line 36) in the same way as S2, namely, using the BIND_AS_PREVIOUS option. Further distribution information is no longer needed since the application knows the next message M is not part of the affinity set. The arrowed curved lines in FIG. 2 represent the BIND_AS_PREVIOUS associations between affinity set messages and their immediately preceding messages of the set.

In fact, neither of the next two messages M and N from QM1 is part of an affinity set and so may be put to either instance of Q3 by the workload management algorithm. By way of example, message M is shown on line 37 as being put to the instance of Q3 on QM4 whereas message N is shown on line 38 as being put to the instance of Q3 on QM2.

Next, the further affinity set T is processed and message T1 is put (line 39) to whichever queue manager hosting Q3 is selected by the workload management algorithm. For the purposes of this example, the selected queue manager is assumed to be QM4. As was the case with set S, the selection information for message T1 is saved (line 40) and used by QM1 to associate the object handle for the Q3 instance on QM4 with the set T. When message T2 is put to Q3, on line 39, BIND_AS_PREVIOUS is again specified so that it also goes to the Q3 instance on QM4.

Thus, although normal workload management for messages put to Q3 was initially selected by specifying the BIND_NOT_FIXED option, it is overridden for sets S and T to make sure that they arrive on respective single instances of Q3. Assuming the application has finished with Q3 for the time being, the two instances of Q3 on QM2 and QM4 may now be effectively closed (line 42) by QM1 disconnecting from them.

Figure 4:
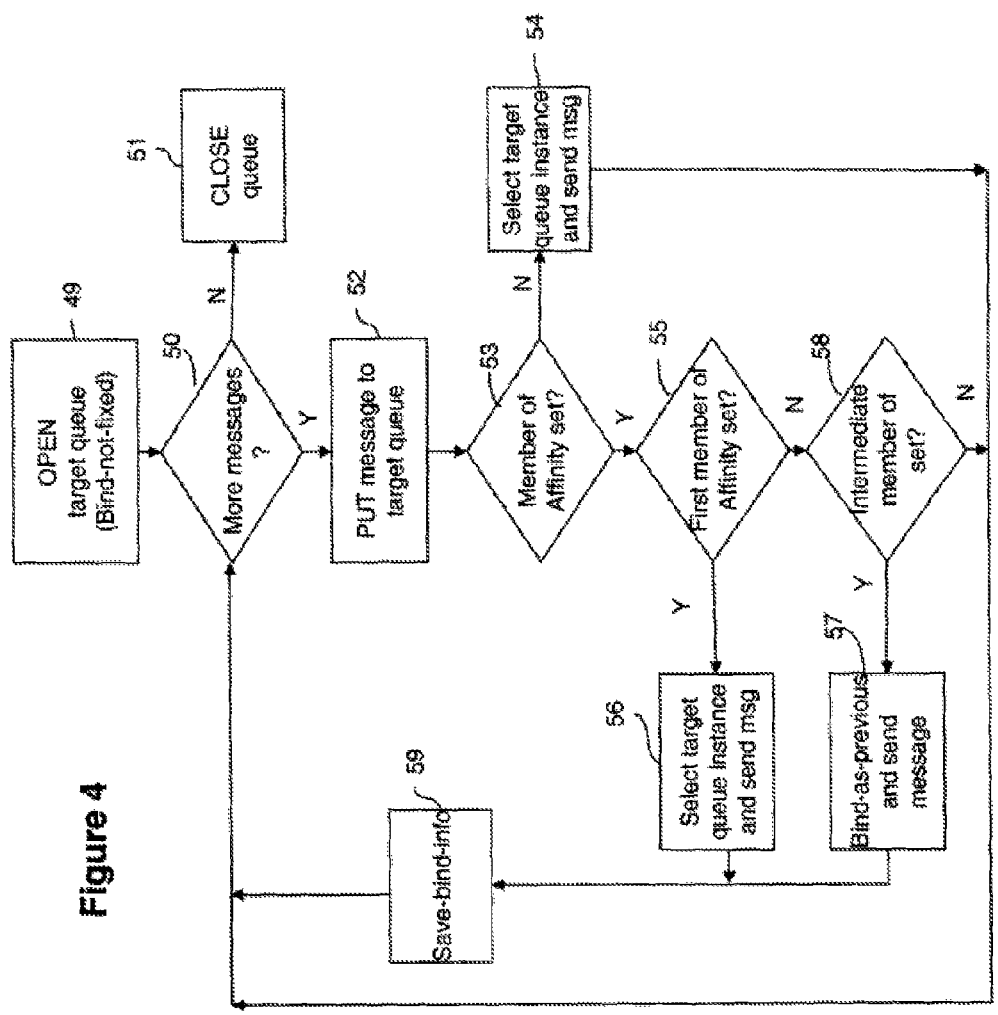
FIG. 4 is a flow diagram further illustrating the steps of processing the string of messages of FIG. 2.

FIG. 4 is a flow diagram further illustrating the process steps of the invention, as used in the example of FIGS. 2 and 3. In step 49, the target queue Q3, which has multiple instances on QM2 and QM4, is opened, specifying BIND_NOT_FIXED. Assuming, there are messages to be processed and this is not the end of the message string, as determined by step 50, the first message is supplied for putting to the target queue in step 52.

The application program knows whether this message is part of an affinity set. If it is not, as indicated by decision box 53, it is put to whichever instance of the target queue is selected by the workload management algorithm in step 54. If it is part of an affinity set and is the first message of the set, as indicated in decision box 55, the workload management algorithm is again used, in box 56, to select the target queue instance and send the message to that instance. The distribution information is saved in step 59 in response to the SAVE_BIND_INFO having been specified. Control then returns to step 50 and awaits the next message, upon receipt of which appropriate ones of the above steps will be repeated.

If the next message is also part of the affinity set, other than the last, as determined in step 58, it is sent to the queue instance identified by the saved distribution information, as a result of the BIND_AS_PREVIOUS option being specified on the PUT call. Again, the distribution information is saved in step 59. When the last message of the affinity set is put, as indicated by the negative output from decision step 58, it is not necessary to save further distribution information and control returns directly to step 50. When the result of step 50 is that there are no more messages to send, the queue is closed in step 51.

This invention thus offers the capability to route different affinity sets of messages to queues on different messaging servers without first having to close the queues between the different sets of messages or disable normal workload management.

The approach of FIGS. 3 and 4 is sufficient for many applications where each affinity set is an unbroken string of messages. However, it will not work in more complex situations where messages of different affinity sets may be interleaved with each other or mingled with ordinary messages. This is because the BIND_AS_PREVIOUS option causes a message to be routed to the same destination as the immediately preceding message, which, in the more complex example, may not be part of the same affinity set.

Figure 5:
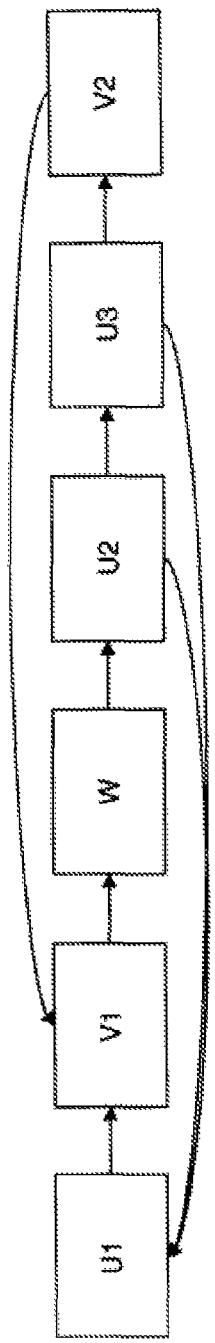
FIG. 5 represents a further mixed string of messages including two affinity sets whose messages are intermingled which may processed in the cluster of FIG. 1 according to a second example of the present invention.

FIG. 5 shows an exemplary message string of this type. In this string, a first affinity set consisting of messages U1, U2, and U3 is interleaved with an unrelated single message W and with a second affinity set consisting of messages V1 and V2. It can be seen that routing messages to the queue instance of the preceding message would not result in all members of the same affinity set ending up on the same queue instance.

This can be overcome by associating workload distribution information with each particular set and using this, rather than the more general, BIND_AS_PREVIOUS option to determine where subsequent members of the set are sent. This distribution information is returned by the queue manager to the application when the message has been put. In WebSphere MQ, either a message descriptor or a message handle can be used to provide a mechanism for returning distribution information about a message to the application.

FIG. 6 is a sequence diagram illustrating this alternative way of processing messages, using the exemplary string of messages of FIG. 5. Again, the application program, the three queue managers QM1, QM2 and QM4 and the Workload Algorithm are represented by vertical bars.

The first step, in line 60, is for the application program to issue an MQOPEN call to open Q3. No local instance of Q3 exists on QM1 but two instances, 11 and 12 of FIG. 1 of Q3 exist on queue managers QM2 and QM4. As with FIG. 3, the MQOPEN call specifies BIND_NOT_FIXED. This effectively activates the workload management algorithm for QM1. Then, an MQPUT call is issued to put the first message U1 of an affinity set, U, to queue Q3. The workload management algorithm decides to send this message to the instance of Q3 on queue manager QM2. These actions are represented by line 62.

QM1 remembers which version of Q3 was chosen (line 63) and returns this choice in the message handle supplied to the application, as output from the MQPUT call. The message handle is associated with and stored for use with further members of set U.

However, the next message to be put, V1, is from a different affinity set so the previously stored message handle is not used and, instead, the workload algorithm is used to determine the queue instance of Q3 to be used and chooses that on QM4, as indicated by line 64. The selection of QM4 (line 65) is remembered by QM1 and returned to the application in a further message handle for future reference in connection with set V.

Next a single message W, which is not a member of either affinity set, is put to the instance of Q3 on QM2, as determined by the workload management algorithm (line 66). In this case, a message handle may be returned in the normal course of events but is not needed for distribution purposes and so is not illustrated.

After this, the remaining members U2 and U3 of affinity set U are put to the instance of Q3 indicated by the stored message handle for set U, as shown in lines 67 and 68. Finally, on line 69, the final message V2 of set V, is put to the instance of Q3 on QM4, as indicated by the stored message handle for set V. Reference back to the first message handle of each affinity set is also represented in FIG. 5 by arrowed lines.

Assuming all necessary messages have been put for the time being, the application program on QM1 may then issue an MQCLOSE call on line 61 to close Q3. The instances of Q3 on queue managers QM2 and QM4 do not necessarily disappear but are effectively disconnected by QM1.

Figure 7:
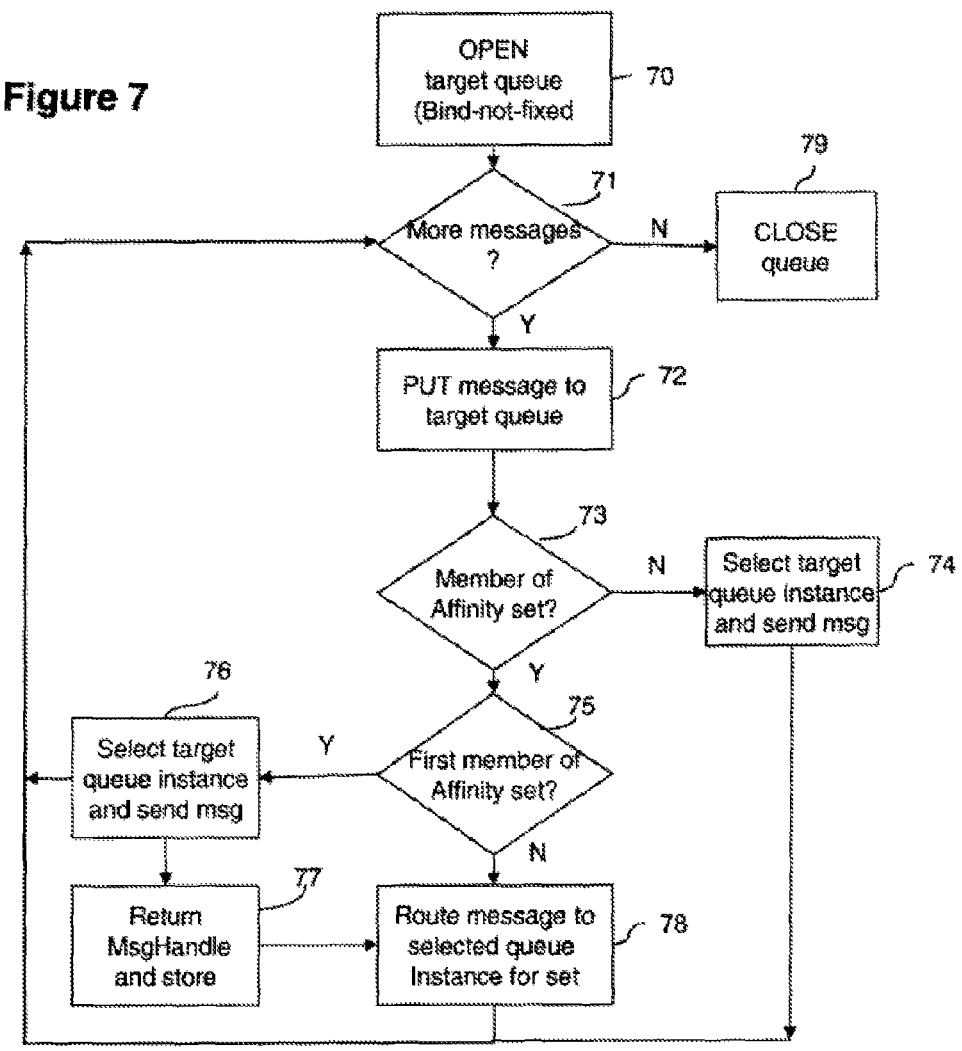
FIG. 7 is a flow diagram illustrating the process steps of the second example of the invention.

FIG. 7 is a flow diagram illustrating the process steps of the invention, as used in the example of FIGS. 5 and 6. The initial steps are identical to those of FIG. 4. Thus, in step 70, the target queue Q3, which has multiple instances on QM2 and QM4, is opened, specifying BIND_NOT_FIXED. Assuming, there are messages to be processed and this is not the end of the message string, as determined by step 71, the first message is supplied for putting to the target queue in step 72.

The application program knows whether this message is part of an affinity set. If it is not, as indicated by decision box 73, it is put to whichever instance of the target queue is selected by the workload management algorithm in step 74. If it is part of an affinity set and is the first message of the set, as indicated in decision box 75, the workload management algorithm is again used, in box 76, to select the target queue instance and send the message to that instance. Control then returns to step 71 and awaits the next message, upon receipt of which appropriate ones of the above steps will be repeated.

When the workload distribution information for the first message of a set has been made, in step 76, the selection is incorporated in the message handle and this is returned to and stored by the application in step 77. In step 78, this information is then used to route subsequent messages of the affinity set to the same instance of the target queue, after which, control returns to step 71, to await the next message.

When the application decides it has no more messages to send, as detected in step 71, it closes the target queue in step 79.

So, to summarize, for the "BIND_AS_PREVIOUS" method of FIGS. 4 and 5, no workload distribution information need be returned to the application. The queue manager can remember it on behalf of the application and use this information when it receives the next "BIND_AS_PREVIOUS" request.

The more flexible message handle technique of FIGS. 6 and 7 requires the application to be able to refer to a particular set of workload distribution information. Using a message handle returned by MQPUT, the message handle can contain the information which can subsequently be used on the call to put another message in the same affinity set.

What is claimed is:

1. A method of processing messages, including affinity sets of related messages, for use with a messaging and queuing system of the type capable of supporting a cluster, the method comprising:

in response to an application program command to a messaging server, the messaging server opening a queue having multiple instances of the queue on respective messaging servers of the cluster, wherein the messaging server is among a plurality of logically associated messaging servers for controlling and hosting queues of messages, wherein the messaging server and respective messaging servers are logically associated, and in response, generating an object handle pointer to distribution information and saving the object handle pointer to distribution information, wherein the distribution information selects a particular queue instance for at least one message;

in response to application program commands to the messaging server to put a plurality of messages on the queue, distributing messages among the multiple instances of the queue so as to balance a workload between at least two messaging servers according to predetermined rules, wherein the at least two messaging servers are among the plurality of logically associated messaging servers wherein distributing messages among the multiple instances of the queue on the respective messaging servers of the cluster is specified by an option in an application program command which causes selection of a queue instance to be deferred until a command to put messages on the queue is received, wherein distributing messages further comprises:

using the object handle pointer to distribution information that identifies the particular queue instance for a first message of a plurality of messages;

in response to selecting the particular queue instance for the first message, deriving distribution information from a message attribute of the first message and the first message is a first message of an affinity set;

obtaining and storing distribution information for a particular queue instance to which the first message is put;

in response to an application program command to the messaging server to put a first further message to the queue, wherein the first further message is part of the affinity set, sending the first further message to the particular queue instance using the distribution information, and further in response to the first further message being a first or intermediate member of the affinity set, the messaging server saving the object handle pointer to distribution information, otherwise not saving the object handle pointer to distribution information; and in response to an application program command to the messaging server to put a final message to the queue and further in response to determining that the final message is a final member of the affinity set, the messaging server not saving the object handle pointer to distribution information.

2. The method as claimed in claim 1, further comprising:

referencing an distribution information associated with a predecessor message of the first message; and wherein putting the first further message of the affinity set to the queue comprises putting the first further message to a queue of the predecessor message.

3. The method as claimed in claim 1 further comprising:

in response to an application program command to the messaging server to put a second further message to the queue, wherein the second further message is not part of the affinity set, putting the second further message to an instance of the queue as determined by the predetermined rules.

* * * * *